Patented Apr. 7, 1925.

1,532,476

UNITED STATES PATENT OFFICE.

WILLIAM V. CRUESS, OF BERKELEY, CALIFORNIA; DEDICATED, BY MESNE ASSIGNMENTS, TO THE CITIZENS OF THE UNITED STATES.

PROCESS OF GLACÉING FRUIT.

No Drawing.  Application filed September 10, 1924. Serial No. 736,916.

(GRANTED UNDER THE ACT OF MARCH 3, 1883; 22 STAT. L. 625.)

*To all whom it may concern:*

Be it known that I, WILLIAM V. CRUESS, a citizen of the United States, residing in the city of Berkeley, county of Alameda, State of California, whose post-office address is Berkeley, California, have invented a certain new and useful Improvement in the Process of Glacéing Fruit.

This application is made under act of March 3, 1883, chapter 143 (22 Stat., 625), and the invention herein described and claimed may be used by the Government of the United States, or any of its officers or employees, in the prosecution of work for the Government, or any person in the United States, without payment to me of any royalty thereon.

My invention relates to a process of glacéing fruit. Heretofore glacéd fruit has been prepared by processes which are either excessively costly, or which yield products inferior in quality to that of glacéd fruit prepared according to the new process invented by me. Aside from the above objections to present commercially employed processes for the preparation of glacéd fruit, the following additional disadvantages are cited:

1. The time consumed in the preparation of glacé fruit is excessive.

2. In the present commercial methods of preparation of glacéd fruit, the fruit must be manipulated in small quantities and in small containers.

3. Present commercial methods require great skill and much experience on the part of the operator in order to obtain successful results.

4. In applying present commercial methods there is great variation in quality of the coating produced.

The object of my invention is to provide a simple process, easy of application, which will obviate the disadvantages of the present process, as hereinbefore particularized. To accomplish this I first prepare the fruit for glacéing as is now done in commercial practice or in a similar manner. Essentially, this preparation consists in (1) treating the fruit in syrups of progressively increasing concentration of cane or beet sugar (sucrose) and corn syrup (commercial glucose) or in other sugar containing syrups; (2) draining the fruit to remove excess adhering syrup, (3) and drying a short time to render the surface of the fruit sufficiently dry to permit glacéing.

I then wet the fruit by immersion in or spraying, or otherwise wetting with a solution containing pectin or a solution containing pectin and other substances such as sugar, or harmless organic acid, etc. I then drain the wet fruit and dry it. Drying may be accomplished in any suitable manner; for example on wire screen trays in artificially heated air or by exposing the fruit on such trays to the air without application of artificially produced heat.

The advantages claimed for my process may be briefly summarized as follows:

1. It yields a glacéd fruit of attractive, glossy appearance.

2. Crystallization of the coating during storage after glacéing does not occur so readily with my process as with the usual coating; and therefore, fruit treated by my process retains its attractive appearance for a longer time than fruit prepared by the usual process.

3. To use my process no previous experience, or unusual skill is required because of the extreme simplicity of the process.

4. It decreases the labor cost of glacéing fruit by shortening the time required and by making use of unskilled and therefore less costly labor.

5. It produces a uniformly good coating; the great variation in quality of the coating made by present commercial methods is not encountered.

6. It may be applied in larger containers and to larger lots of fruit than is possible in the use of present methods.

Having thus described my invention, I claim:

The process of glacéing fruit which comprises treating the fruit in sugar syrups of progressively increasing concentration, thereafter draining the fruit to remove excess adhering syrup, then allowing the adhering syrup to dry, and finally coating the syrup-covered fruit with a solution containing pectin and sugar.

WILLIAM V. CRUESS.